Nov. 4, 1941.   R. E. FALLS   2,261,461
LARGE CAPACITY SAFETY VALVE
Filed Jan. 5, 1939   2 Sheets-Sheet 1

Inventor:
Robert E. Falls
By: Joseph O. Lange Atty.

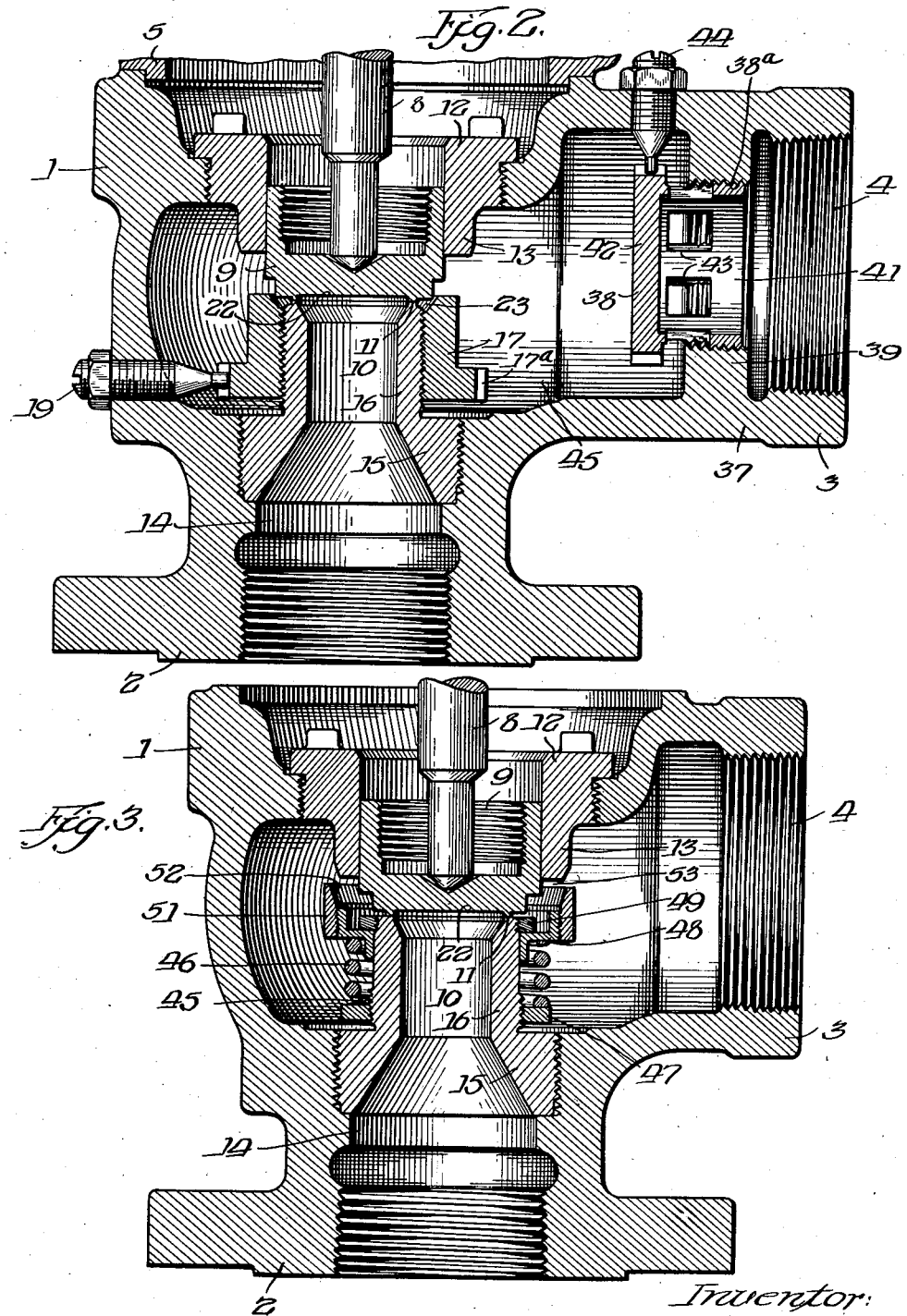

Patented Nov. 4, 1941

2,261,461

UNITED STATES PATENT OFFICE 2,261,461

LARGE CAPACITY SAFETY VALVE

Robert E. Falls, Chicago, Ill., assignor to Crane Co., Chicago, Ill., a corporation of Illinois Application January 5, 1939, Serial No. 249,358

1 Claim. (Cl. 137—53)

This invention relates to pop safety valves and more particularly to the type referred to as full-area pop safety valves.

It is an object of my invention to provide a valve for compressible fluids, such as steam, air, gas and the like, which when wide open will admit passage therethrough of substantially that quantity of fluid which would flow through the nozzle or seat bushing of the valve if the valve disc and superstructure were removed and the fluid allowed to escape to atmosphere.

Another object of my invention is to provide a safety valve in which the lifting forces acting upon the closure member when the latter is not in contact with its seat are relatively low, thus the valve requires a comparatively light spring to resist the action of the lifting forces.

Another object of my invention is to provide a plurality of either manually or automatically adjustable regulator means which restrict the flow of fluid past the closure member thereby effecting higher lift of the closure member.

I am aware that substantially full-area discharge has been achieved by others, as for example, in the United States Patents #86,168 to Low, #306,208 to Ashton et al., and #1,743,430 to Coffin, by deflecting or reversing the flow of escaping fluid, thus utilizing the reactive force to effect sufficient lift of the closure member or disc to change the controlling orifice from the disc-seat opening to the throat or inlet opening of the valve. The principle of the operation of my invention is based upon the application of a fundamental law of the flow of compressible fluids which in effect states that the rate of discharge of a compressible fluid through a nozzle of a given throat area and at constant inlet pressure is a function of the inlet pressure alone, provided that the back pressure on the nozzle is equal to or less than a certain pressure known as the critical pressure.

The above referred-to law, which has been established theoretically and by actual tests, restricts Napier's formula and other empirical formulas for the discharge of compressible fluids through nozzles and orifices as these formulas are applicable only when the back pressure is less than the critical pressure. The critical pressure of a gas or vapor may be considered one of the fundamental properties of the substance. The ratio of the critical pressure to the inlet pressure of a particular compressible fluid may be expressed in terms of its specific heats, that is, $$r = \left(\frac{2}{K+1}\right)^{\frac{K}{1-K}}$$

where $r$ is the critical pressure ratio and $K$ is the ratio of the specific heats at constant pressure and at constant volume. The approximate values of $r$ for saturated steam and air are .58 and .53, respectively. In other words, a valve having an inlet pressure of 100 pounds per square inch absolute of saturated steam, in order to achieve full area discharge, could not have a back pressure exceeding approximately 58 pounds per square inch absolute. Another way of stating the law is to say that the rate of discharge of compressible fluids through an opening is not influenced by the contour or character of the outlet opening, provided that any obstruction or restriction of the flow in the outlet opening is not sufficient to cause a back pressure at the throat or minimum area of the inlet opening greater than the critical pressure of the fluid. However, there is one exception to the general law which must be kept in mind in adapting the principle to a safety valve. In order to obtain full area discharge the inlet pressure must be sufficiently high so that the critical pressure is always above atmospheric pressure.

It is a further object of my invention to provide a valve employing the principle of increasing the back pressure of the fluid flowing through the valve to a pressure not greater than the critical pressure and utilizing the back pressure to attain sufficient lift of the closure member or disc to transfer the orifice controlling the rate of discharge from the disc-seat opening to the throat or inlet opening.

For a full understanding of my invention and its objects and advantages, reference may be had to the following detailed description of the preferred embodiments taken in connection with the accompanying drawings, in which Fig. 1 is a vertical sectional side view of a valve embodying my invention.

Fig. 2 is a fragmentary sectional view of a valve showing a modified application of my invention.

Fig. 3 is a fragmentary sectional view of a valve embodying a further modification of my invention.

Like reference characters refer to like parts throughout the various views of the drawings.

Figure 1:
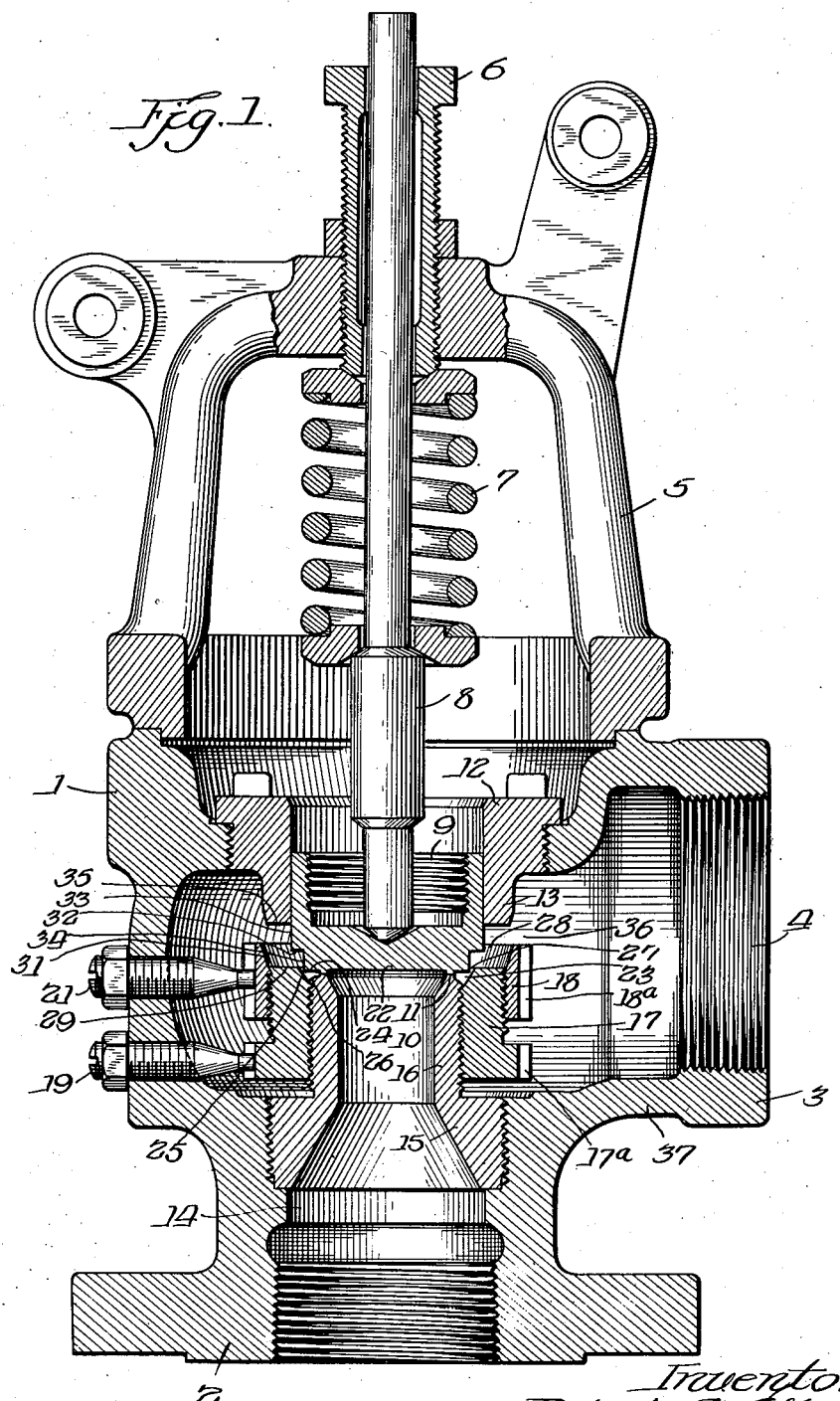

Referring to Fig. 1, the valve body or casing generally designated I is formed having its lower portion 2 adapted for attachment to a boiler or other pressure containing vessel (not shown) by bolting or screwing onto a conduit connection. A side portion or outlet 3 of the casing I is provided with screw threads 4 for attachment to an exhaust pipe (not shown). The upper portion of the body I has attached to it the usual yoke 5 which by cooperation with the adjusting nut 6 and the spring 7 guides and maintains a downwardly directed force upon the stem 8 which in turn transmits the downwardly exerted force to the piston-like closure member or disc 9 normally maintaining the latter in abutting contact with the seat II.

The cylinder bushing or fixed annular member 12 which serves also as a guide for the disc 9, is preferably detachably secured to the upper portion of the casing 1 to facilitate assembly operations on the valve and has a depending annular lip 13. The disc 9 is positioned within the bushing 12 and is adapted for reciprocable movement therein for opening and closing the valve.

The lower portion of the casing 1 is provided with an inlet passageway 14 preferably having a detachable seat bushing 15, the latter providing the throat or seat nozzle 10 which is preferably a continuation of the inlet passageway. The upper portion 16 of the seat bushing 15 is screw-threaded on its exterior surface and has mounted thereupon the internally screw-threaded pop regulator ring 17 which when rotated will move axially upon the shank portion 16 of the seat bushing. Exterior screw threads are also provided upon the upper portion of the pop regulator ring 17 upon which the blowdown regulator ring 18 is mounted for axial adjustment with respect to the depending lip 13 of the bushing 12. Locking plugs 19 and 21 are provided which extend from the exterior of the casing 1 to engage the serrated exterior surfaces 17a and 18a of the pop regulator ring 17 and the blowdown regulator ring 18, respectively, for the purpose of preventing the accidental movement and maladjustment thereof.

The manner of operation of a device employing my invention can best be explained by describing initially the function of each of the cooperating members. The compressible fluid controlled by the valve enters the valve through the inlet passageway 14 and throat 10 and thereupon exerts an upwardly directed force against the exposed lower surface 22 of the closure member which is counterbalanced by the downwardly directed force exerted by the spring 7. When the upwardly exerted force exceeds the counterbalancing force referred to, the disc or closure member 9 will rise from its normal abutting contact with the seat 11 and allow the fluid to escape into the annular chamber 23 which is defined by the angularly disposed surfaces 24, 25 and 26, respectively, of the disc 9, the pop regulator 17 and the seat bushing 15. It will be noted that by axial adjustment of the pop regulator ring 17, the size of the annular outlet orifice or passageway 27 of the chamber 23 may be varied to restrict more or less the escape of the fluid from the chamber 23 whereby the desired popping or release action of the valve may be obtained.

With the disc 9 slightly raised from the seat 11, allowing the fluid to escape into the chamber 23, the upwardly directed force of the fluid is exerted upon both surfaces 22 and 24 of the disc 9 thereby causing a further rise of the disc and a corresponding enlargement of the orifice 27. The fluid escaping from the chamber 23 enters the annular chamber 28 which is defined respectively by the annular surface 29 of the pop regulator ring 17, the annular surface 31 of the blowdown regulator ring 18, the annularly extending surfaces 32, 33, 34 and 24 of the disc 9, and the under-surface 35 of the depending lip 13. It will be apparent that the annular outlet orifice or passageway 36 of the chamber 28 may be varied in its size by axial movement of the blowdown regulator 18 by rotation of the latter member upon the pop regulator ring 17 to restrict generally the escape of fluid from the chamber 28.

The aforesaid restriction of fluid flow through the orifice 36 causes an increase of the fluid pressure within the chamber 28 thereby producing a still further rise of the disc 9 by reason of the pressure acting upon the surface 32 of the disc 9, in addition to acting upon the plane surfaces 22 and 24 of the disc. As previously explained, the pressure within the chamber 28, which is customarily referred to by those skilled in the art as back pressure, must not be permitted to exceed the critical pressure of the fluid if maximum efficiency of the valve is desired. In order to prevent any restriction of flow by the orifice passageway 36, it is necessary that its area must be not less than $1/r$ times the area of the throat or seat nozzle 10, the latter being the fluid inlet leading to the chamber 28 and $r$ being the critical pressure ratio of the fluid. However, by proper adjustment of the orifice 36 and the spring 7 the fluid pressure acting upon the disc 9 can readily be made to cause the disc to rise to such an extent that the effective area of the disc-seat opening is greater than the effective area of the throat 10, thus the latter orifice becomes the controlling orifice which determines the rate of fluid flow through the valve.

From the above explanation it is apparent that my invention provides a double pop of the valve in securing a full area discharge, that is, a discharge in volume at least equal to the discharge through the inlet throat 10. However, by proper adjustment of the blowdown regulator ring 18 it is possible to exercise such fine degree of control so that the two pops or fluid discharges appear to occur simultaneously. The closing action of the valve comprises only the downward movement of the disc 9 to an abutting contact with the seat 11 which occurs when the aggregate lifting forces of the fluid acting upon the disc decrease to a quantity less than the spring load.

Of course, the detailed manner in which regulation of the flow through the chamber of the valve casing is accomplished may vary considerably in the many forms available, and in the latter connection attention is now directed to a modified form which is shown in Fig. 2. Therein the body or casing 1 has an extended side outlet portion 37 in which the adjustable blowdown regulator member 38 is located. With the exception of the above mentioned change the construction of the valve is quite similar to the construction of the valve described in connection with Fig. 1 except for the location of the blowdown regulator ring 18. Obviously, therefore, certain minor details in mechanical construction presented in Fig. 1, such as the external screw threads on the pop regulator ring 17 and the locking plug 21, may be omitted in the modification now described in connection with Fig. 2.

The extended outlet 37 has an internal annular shoulder 39 which is provided with female screw threads for the reception and adjustment of the blowdown regulator member 38. The regulator 38 preferably, but not necessarily, is a tubular member open at the end 41 and closed at the opposite end 42 as indicated. Male screw threads 38a are provided on the tubular portion of the regulator for cooperation with the complementary threads of the shoulder 39. A plurality of ports 43 is preferably provided in the wall of the tubular portion of the regulator to allow for the passage of the escaping fluid from the exterior to the interior thereof and from which the fluid by reason of the open end 41 is free to discharge from the valve. The periphery of the closed end 42 is similarly serrated as described in connection with the ring 18 of Fig. 1 for cooperation with the locking plug 44 to prevent the accidental movement of the regulator.

The manner of operation of this modification of my invention is identical in principle to the operation described in connection with Fig. 1. Fluid which enters the valve through the inlet 14 and the throat 10 exerts an upwardly directed force against the disc 9 and when the upwardly directed force exceeds the downwardly directed force exerted upon the disc through the stem 8 and by the spring 7, the disc rises from the seat 11, admitting the fluid to the chamber 23. Increased pressure within the chamber 23 forces the disc farther from its seat and admits the fluid to the chamber 45 which is an equivalent in purpose of the chamber 28 described in Fig. 1. The blow-down regulator 38, having been previously axially adjusted to cover or uncover a portion of the ports 43 to restrict generally the passage of fluid therethrough, causes a back pressure to be built up within the chamber 45. Again for the reasons previously given, it is imperative, in order to provide for the maximum capacity of the valve, that the back pressure within the chamber 45 should not be permitted to exceed the critical pressure of the fluid. The back pressure cooperating with the inlet pressure forces the disc to a position sufficiently removed from the seat 11 so that the throat opening 10 becomes the controlling orifice which determines the rate of fluid discharge through the valve.

As to a further modification illustrative of the many possible applications of my invention, attention is now directed to Fig. 3 in which there is a resiliently mounted blowdown regulator ring 51 which automatically prevents the back pressure within the valve from exceeding the critical pressure of the fluid. Attention is directed to the portion 16 of the seat bushing 15 which has the external screw threads 45 adjacent to the enlarged portion of the bushing. Encircling the portion 16 is a coiled or helical spring 46, the lower end of which abuts the adjusting nut 47 and the upper end of which shoulders against the angular sleeve 48 which is retained upon the portion 16 by the nut 49 and which is adapted to be movable for vertical movement upon the portion 16 against the compression of the spring 46. The outermost periphery of the angular sleeve 48 is provided with screw threads for axial adjustment of the ring 51 which is carried by the sleeve 48. The construction shown and described provides an annular chamber 52 having a restricted annular opening or outlet 53 surrounding the lower portion of the disc and the seat.

Compressible fluid entering the valve through the inlet 14 and the throat 10 and exerting sufficient pressure against the surface 22 of the disc 9 to lift the disc from abutting contact with the seat 11, discharges into the chamber 52 where, by reason of the relative restriction afforded by the outlet 53, back pressure is built up within the chamber. The back pressure in the chamber 52 simultaneously forces the disc 9 to rise farther from the seat 11 and forces the angular sleeve 48 to be moved downwardly upon the portion 16 of the seat bushing against the compression of the spring 46. By proper pre-adjustment of the compression in the spring 46 by the nut 47, the back pressure within the chamber 52 can readily be prevented from exceeding the critical pressure of the fluid, and as the back pressure forces the ring 51 to recede from the depending lip 13 the outlet 53 is accordingly enlarged to permit less restricted flow of the fluid therethrough. However, the spring 46, which urges the sleeve 48 upwardly during the period in which the valve is in the open position thereby restricting more or less the flow of fluid through the outlet 53, maintains back pressure in the chamber 52 which does not exceed the critical pressure of the fluid but which forces the disc 9 upwardly and sufficiently away from the seat 11 so that the controlling orifice, considering valve discharge capacity, shifts from the disc-seat opening to the inlet throat opening 10 of the valve.

The foregoing constitutes a detailed description of preferred embodiments of my invention. Obviously, however, the details described may be varied without departing from the inventive concept disclosed, and it is to be clearly understood that right is herein reserved to all such modifications falling fairly within the scope of the claim appended hereto.

I claim:

In a safety valve for compressible fluids, a casing having an inlet and an outlet, the said inlet having a seat, a spring-loaded closure member therefor, a fixed annular guide member for the closure member, flow regulator means substantially surrounding the said seat, a discharge chamber having its upper limits bounded by the lower portion of the said guide member and annularly located relative to the said closure member, the end limits of the said guide member and the said flow regulator means being maintained in predetermined and fixed spaced-apart relation to increase and to maintain the back pressure at the inlet as defined by the throat of the valve to not more than the critical pressure of the fluid only at such time when the closure member is in its wide open position, the said flow regulator means being substantially unaffected in its discharge capacity by the position of the closure member as the latter member moves from the closed to the fully open position.

ROBERT E. FALLS.